United States Patent
Liu et al.

(10) Patent No.: US 8,116,281 B2
(45) Date of Patent: Feb. 14, 2012

(54) NETWORK GATEWAY AND METHOD FOR RELOCATING THE SAME

(75) Inventors: Zong Hua Liu, Hsinchu (TW); Jyh Cheng Chen, Hsinchu (TW); Shin Ying Pan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 543 days.

(21) Appl. No.: 12/271,136

(22) Filed: Nov. 14, 2008

(65) Prior Publication Data

US 2009/0213823 A1  Aug. 27, 2009

(30) Foreign Application Priority Data

Feb. 25, 2008 (TW) .............................. 97106407 A

(51) Int. Cl.
*H04W 4/00* (2009.01)
(52) U.S. Cl. ........................................ 370/331; 370/401
(58) Field of Classification Search .................. 370/335, 370/401
See application file for complete search history.

(56) References Cited

U.S. PATENT DOCUMENTS

| 2003/0086140 A1* | 5/2003 | Thomas et al. | 359/167 |
| 2004/0264377 A1* | 12/2004 | Kilkki et al. | 370/235 |
| 2005/0213504 A1* | 9/2005 | Enomoto et al. | 370/235 |
| 2008/0076441 A1* | 3/2008 | Zhou | 455/452.2 |

FOREIGN PATENT DOCUMENTS

WO  2006128380  7/2006

OTHER PUBLICATIONS

Taiwanese Office Action dated Nov. 28, 2011 for 097106407, which is a corresponding Taiwanese application, that cites US 2004/0264377, WO 2006/128380, US 2005/0213504, and US 2003/0086140.

* cited by examiner

*Primary Examiner* — Kevin C Harper
*Assistant Examiner* — Sai-Ming Chan
(74) *Attorney, Agent, or Firm* — WPAT, P.C.; Anthony King

(57) ABSTRACT

A method for relocating network gateways comprises the steps of obtaining a moving average of drop ratios and setting the duration of the next detection interval based on the moving average of drop ratios, and requesting at least one mobile station to perform a CSN mobility management procedure when the moving average of drop ratios exceeds a high drop ratio.

16 Claims, 9 Drawing Sheets

NETWORK GATEWAY AND METHOD FOR RELOCATING THE SAME

BACKGROUND OF THE INVENTION

1. Field of the Invention

The invention relates to mobility management, and, more particularly, to dynamically relocating network gateways in Connectivity Service Network anchored mobility management.

2. Description of the Related Art

IEEE standard 802.16 defines the wireless MAN™ air interface specification for wireless Metropolitan Area Networks (MANs). The standard heralds the entry of broadband wireless access as a major new tool in the effort to link homes and businesses to core telecommunications networks worldwide. The WiMAX Forum further proposed the WiMAX Forum Network Architecture compatible with IEEE 802.16. Since the IEEE 802.16 series is designed for wider coverage and broader bandwidth, it is viewed as one of the leading standards in $4^{th}$ generation communication systems.

The network structures of the WiMAX Forum Network Architecture are framed by Access Service Networks (ASNs) and Connectivity Service Networks (CSNs). The Access Service Network (ASN) provides wireless radio access to WiMAX subscribers. It consists of one or more ASN Gateways (ASN GWs) and Base Stations (BSs). ASNs are connected by CSN, which provides Internet Protocol (IP) connectivity services.

ASN anchored mobility management and CSN anchored mobility management are both defined in the WiMAX Forum Network Architecture. ASN anchored mobility management refers to procedures associated with the Mobile Station (MS) movement between BSs and ASNs without changing a reference point. CSN anchored mobility management is based on Mobile IP (MIP) for constructing new connections between CSN and a new ASN GW.

FIG. 1 shows the roaming and handover under ASN anchored mobility management and CSN anchored mobility management. In connection (1), MS establishes a connection with BS A, a connection between BS A and ASN GW A, and a connection between ASN GW and Home Agent (HA) which is located in home CSN. If the MS moves along route (2), a new connection (3) is established between the MS, BS B, ASN GW B, ASN A, and HA. In this situation, ASN GW A is called the anchored ASN GW, and ASN GW B is called the severing ASN GW. Handover latency could be reduced in this way but the end-to-end delay may be longer, and the load of ASN GW A may become heavy if there are too many MSs anchored with ASN GW A.

In some conditions, the system performs ASN GW relocation for requesting MS performing CSN mobility management. Thus, connection (4) is established between MS, BS B, ASN GW B and HA. However, the WiMAX Forum Network Architecture standards do not specify when to carry out the ASN GW relocation. Since the traffic management of gateways is a key factor of network efficiency, introduction of appropriate relocation methods is highly anticipated.

SUMMARY OF THE INVENTION

Accordingly, a method for relocating network gateways is provided. The method begins with calculating a weighted moving average $WMA_{DR}(x)$ of drop ratios during the $x^{th}$ detection interval $DDI_x$. The $(x+1)^{th}$ detection interval $DDI_{x+1}$ is set according to the weighted moving average. If $WMA_{DR}(X)$ is less than a low drop ratio (L_DR), the $DDI_{x+1}$ is set as a long detection interval (L_DI). Otherwise, the $DDI_{x+1}$ is set as a short detection interval (S_DI). When the weighted moving average $WMA_{DR}(x)$ is equal to or exceeds a high drop ratio (H_DR), a user relocation function is performed.

A method for relocating network gateways by predicting the loading of the gateway is also provided. First, the weighted moving average $WMA_{DR}(x)$ of drop ratios during the $x^{th}$ detection interval $DDI_x$ is calculated. The $(x+1)^{th}$ detection interval $DDI_{x+1}$ is set according to the weighted moving average. When the weighted moving average $WMA_{DR}(x)$ is equal to or exceeds a high drop ratio, a user relocation function is initiated. A predicted moving average $W\hat{M}A_{DR}(x+S\_PI)$ is estimated. If the predicted moving average $W\hat{M}A_{DR}(x+S\_PI)$ exceeds the high drop ratio, the user relocation function is performed. If the predicted moving average is less than the high drop ratio but exceeds a medium drop ratio (M_DR), a second predicted moving average $W\hat{M}A_{DR}(x+L\_PI)$ is estimated. If $W\hat{M}A_{DR}(x+L\_PI)$ exceeds the high drop ratio, the user relocation function is performed.

In other aspects of the invention, a network gateway is also provided. The network gateway comprises a processor and a user interface. The processor calculates a moving average of drop ratios within a detection interval and updates the next detection interval according to the moving average. The user interface requests at least one user device to activate a CSN mobility management procedure when the moving average exceeds a high drop ratio.

BRIEF DESCRIPTION OF THE DRAWINGS

The invention will be described according to the appended drawings in which.

PREFERRED EMBODIMENT OF THE PRESENT INVENTION

In one aspect of the invention, the method for relocating network gateways can be roughly divided into two phases: a queue prediction phase and a user relocation phase. In the queue prediction phase, a detection interval is dynamically adjusted according to the traffic load of a queue. When the traffic load is low, the detection interval is longer; and when the traffic load is heavy, the detection interval is shorter for monitoring the drop ratio more intensively. If the traffic load exceeds a threshold, the user relocation phase is started. Users who use the anchored mobility service are requested to activate a CSN mobility management procedure to alleviate the load of ASN GW.

Figure 3:
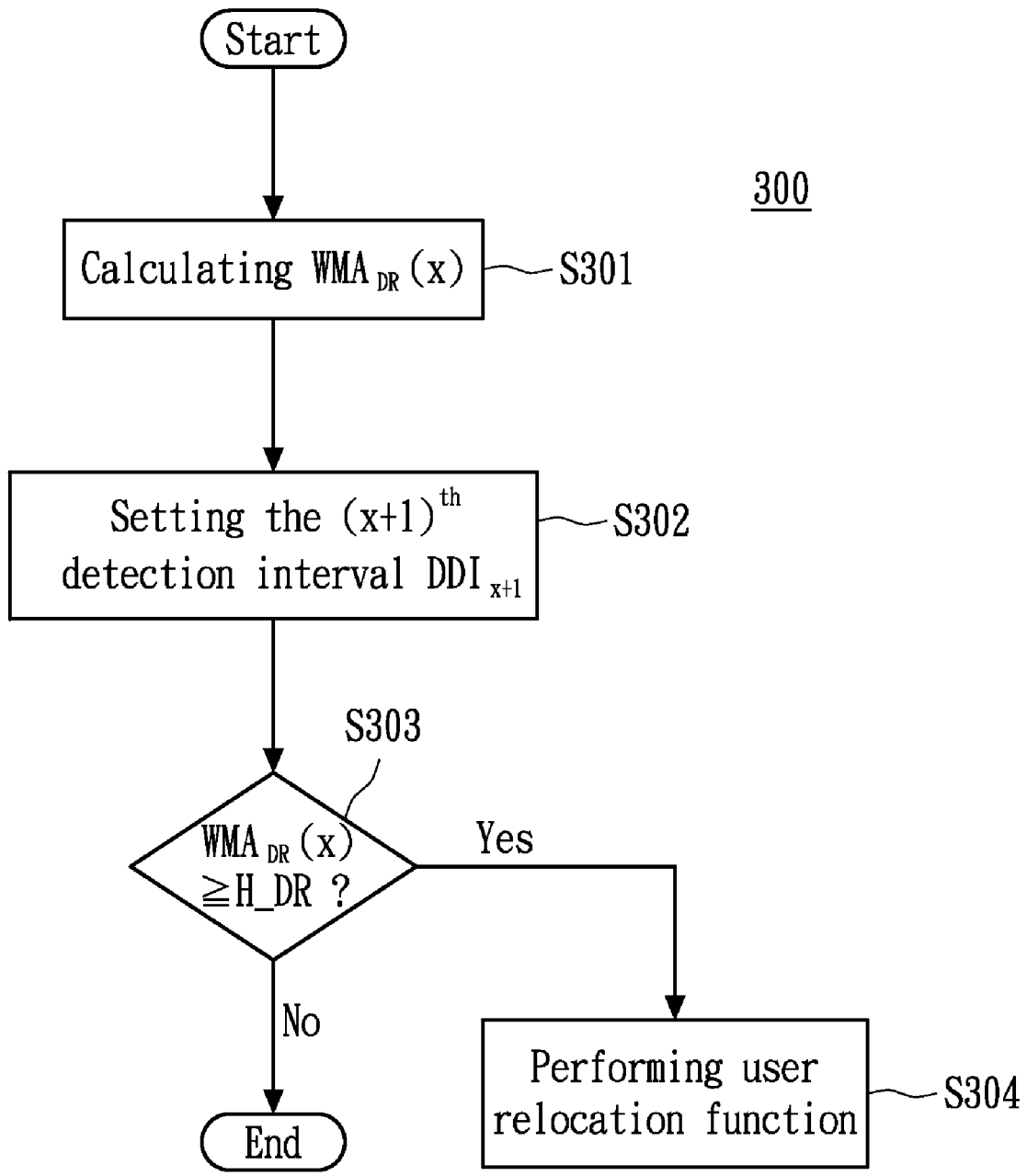
FIG. 3 shows a flow chart of a method for relocating network gateways according to one embodiment of the invention.

FIG. 3 shows a flow chart of a method for relocating network gateways 300 according to one embodiment of the invention. In step S301, a weighted moving average $WMA_{DR}(x)$ of drop ratios during the $x^{th}$ detection interval $DDI_x$ is calculated. In some embodiments of the invention, $WMA_{DR}(x)$ can be calculated by equation (1), $$WMA_{DR}(x) = \frac{\sum_{i=x-n}^{x}(DDI_i \times W_i \times DR_i)}{\sum_{i=x-n}^{x}(DDI_i \times W_i)}, \qquad (1)$$

where n is the window width of moving average, $DDI_i$ is the $i^{th}$ detection interval, $DR_i$ is the $i^{th}$ drop ratio, and $W_i$ is the $i^{th}$ weight. In some embodiments, n is an integer greater than a minimum width MIN-DRs and less than a maximum width MAX-DRs. If n is less than the minimum width MIN-DRs, the weighted moving average $WMA_{DR}(x)$ may collect insufficient drop ratios. If n exceeds the maximum width MAX-DRs, the weighted moving average $WMA_{DR}(x)$ cannot reflect the latest changes of drop ratios. In step S302, the $(x+1)^{th}$ detection interval $DDI_{x+1}$ is set. If $WMA_{DR}(x)$ is less than a low drop ratio, and the drop ratio of the $x^{th}$ detection interval is less than the low drop ratio, the $DDI_{x+1}$ is set as a long detection interval; otherwise, the $DDI_{x+1}$ is set as a short detection interval. In step S303 and S304, when the weighted moving average $WMA_{DR}(x)$ is equal to or exceeds a high drop ratio, a user relocation function is performed.

Figure 4:
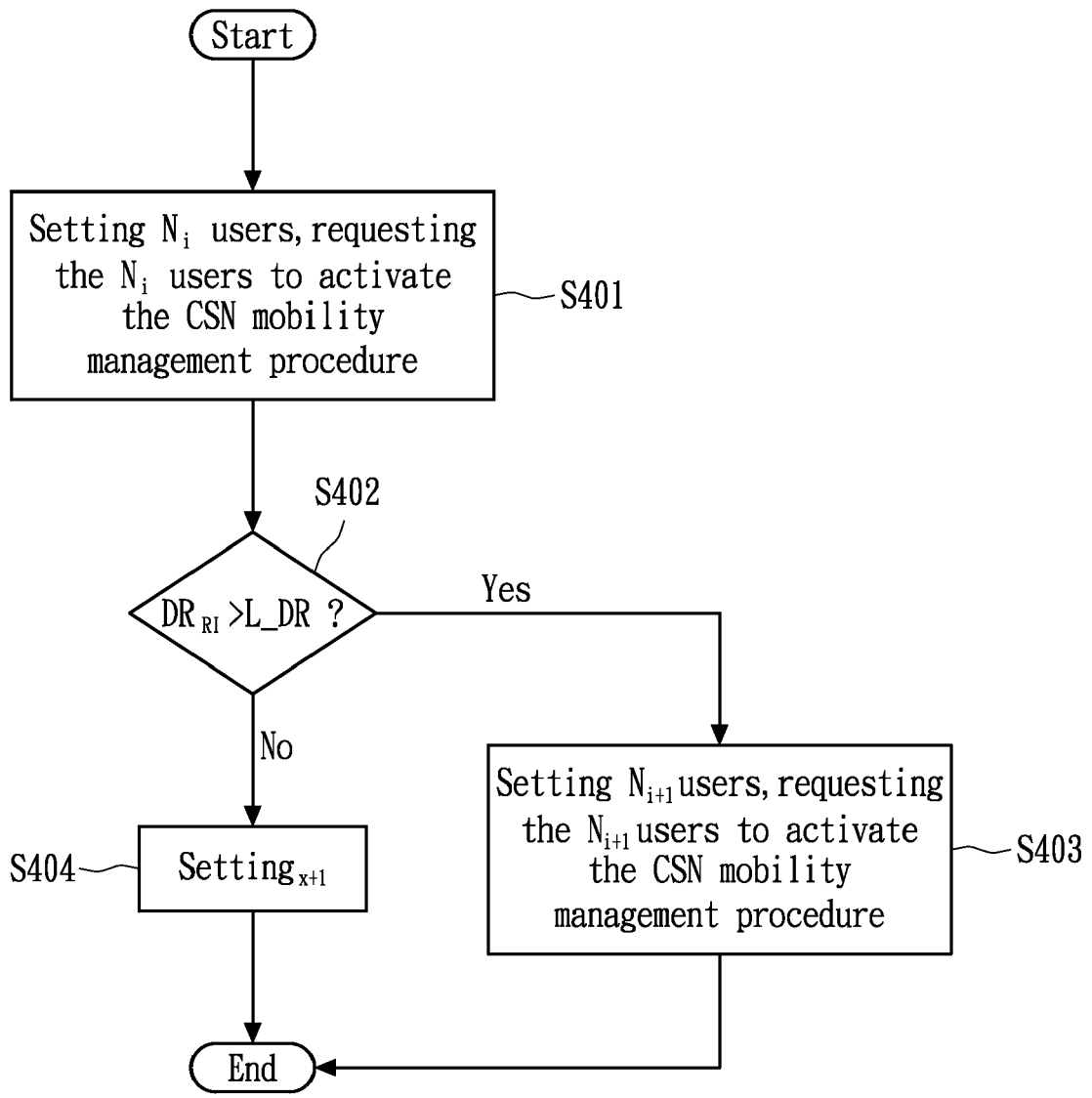
FIG. 4 shows a flow chart of the user relocation function according to one embodiment of the invention.

FIG. 4 shows a flow chart of the user relocation function. In step S401, $N_i$ users are randomly selected. The $N_i$ users are requested to activate the CSN mobility management procedures, wherein i is an integer indicating how many times the step S401 has been executed. In step S402, the drop ratio within a relocation interval $DR_{RI}$ is checked. If $DR_{RI}$ exceeds the low drop ratio, $N_{i+1}$ users are randomly selected in step S403. The $N_{i+1}$ users are requested to activate the CSN mobility management procedures, wherein $N_{i+1}$ is an integer larger than $N_i$. If $DR_{RI}$ is less than the low drop ratio, in step S404, the $(x+1)^{th}$ detection interval $DDI_{x+1}$ is set, and returns to method 300. In some embodiments, $N_1$ is 1, and $N_{i+1}$ equals $N_i$ times two.

Figure 1:
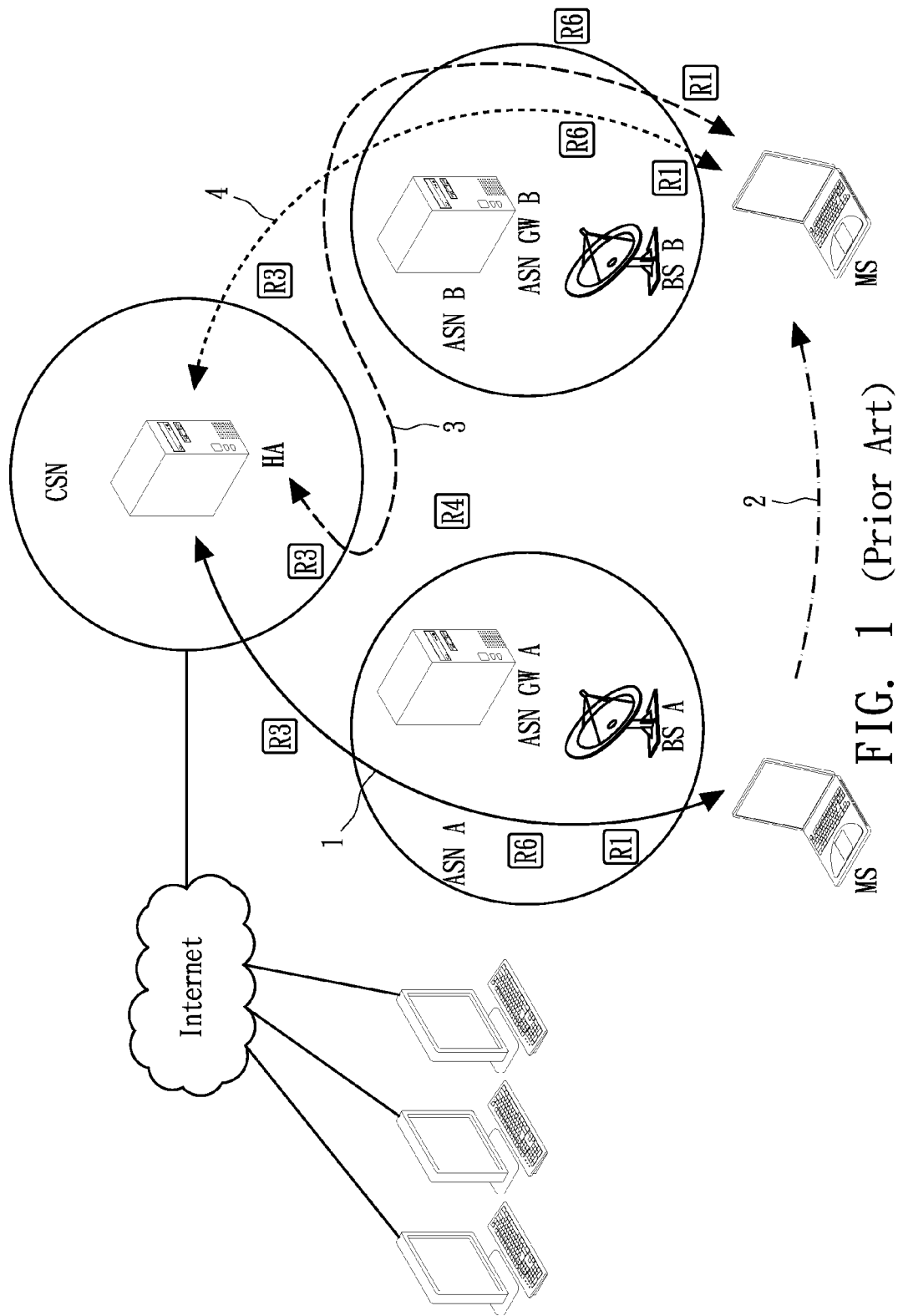
FIG. 1 shows the WiMAX Forum Network Architecture of the prior art.
Figure 2:
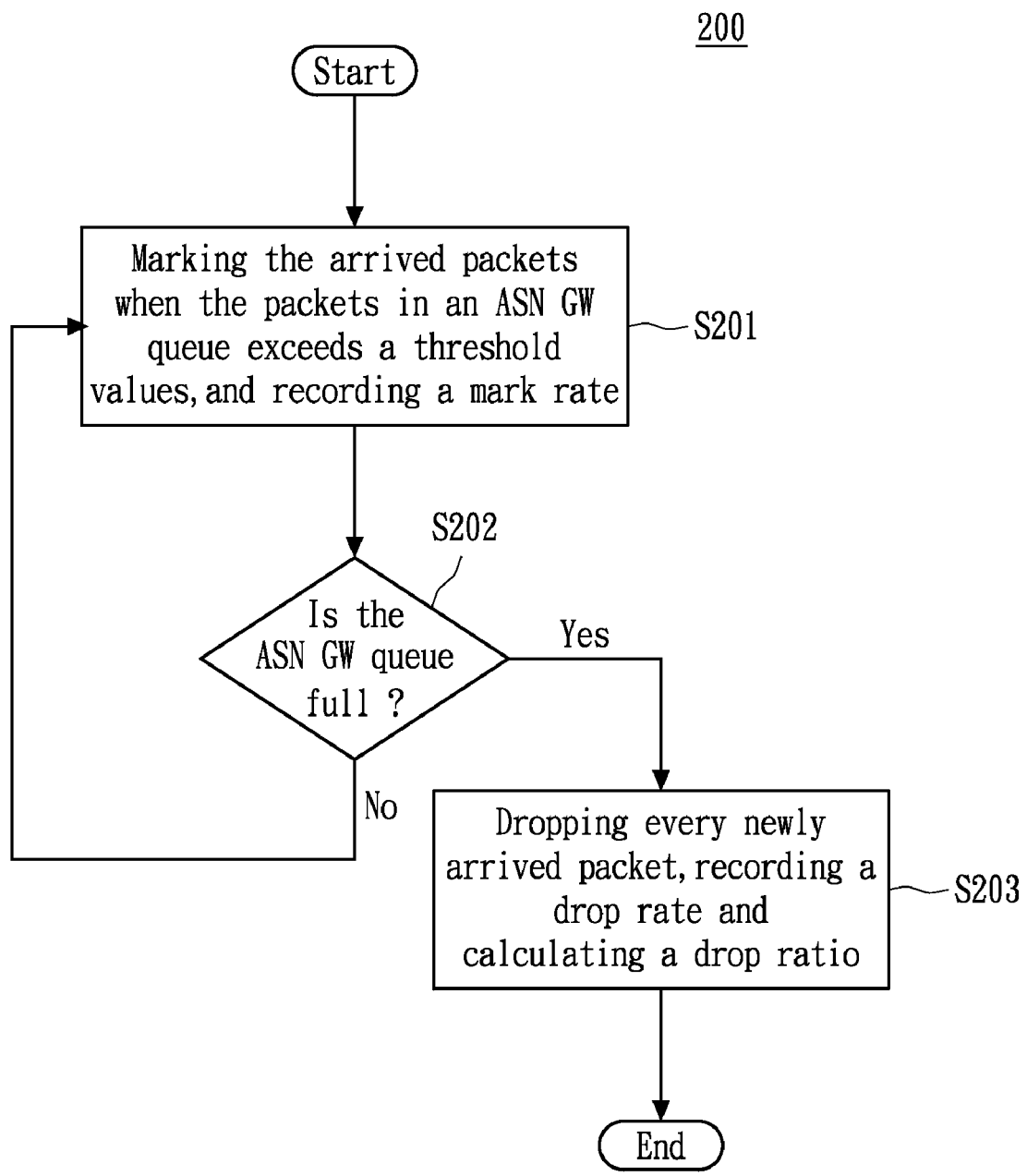
FIG. 2 shows a flow chart of packet traffic management according to one embodiment of the invention.

In some embodiments of the invention, the drop ratios can be measured by packet traffic management. FIG. 2 shows a flow chart of packet traffic management 200. In step S201, the arrived packets are marked when the packets in an ASN GW queue exceed a threshold value, and a mark rate is recorded. The packets stored in the ASN GW queue are packets waiting for transfer to other gateways. In steps S202 and S203, when the ASN GW queue is full, the drop rate of the arrived packets is also recorded. The drop ratio is then determined by the ratio of the number of marked and dropped packets to the number of the received packets in one time interval. The drop ratio can be regarded as an index of traffic load of ASN GW. In some embodiments of the invention, the packets are marked according to a Random Early Detection (RED) algorithm or other similar algorithm.

Figure 5:
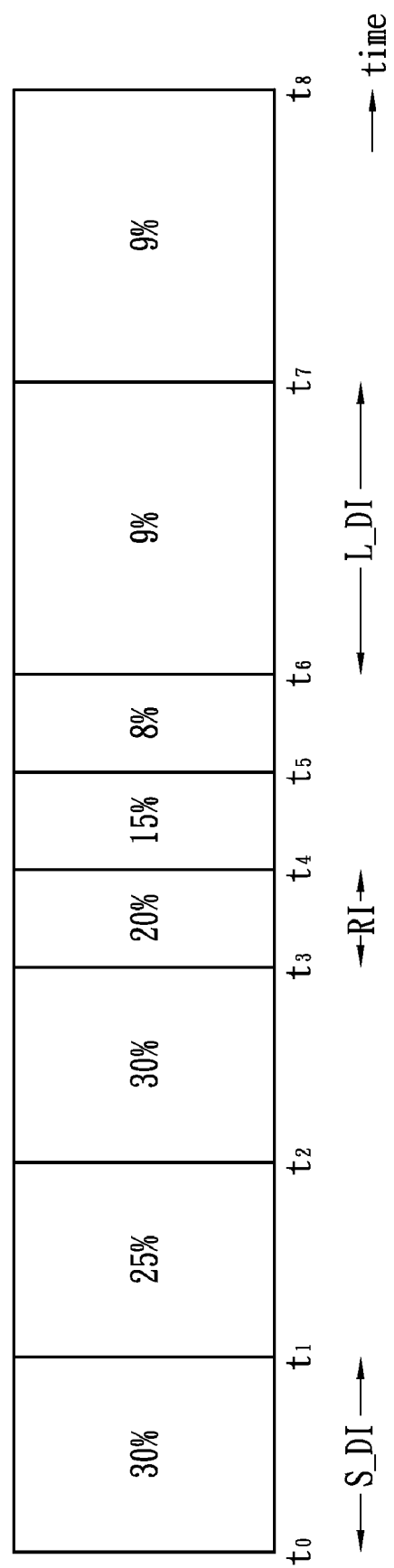
FIGS. 5 and 6 show examples of the determination of weighted moving average $WMA_{DR}(x)$ and the detection intervals.

For further illustration, an example combining FIG. 5 shows how the detection interval DDI is determined, and when to initiate the user relocation function. In this example, the low drop ratio is set at 10%, the high drop ratio is set at 30%, the long detection interval L_DI is set at 20 seconds, the short detection interval S_DI is set at 10 seconds, MAX-DRs is set at 10, and relocation interval is set at 5 seconds. In FIG. 5, the numbers shown in frames are the drop ratios of corresponding interval. At t3, $WMA_{DR}(t3)$ is 30%, exceeding the high drop ratio. Thus after t3, the user relocation function is initiated. At relocation interval t3-t4, a user who is using the anchored mobility service is randomly selected. The selected user is requested to activate a CSN mobility management procedure. In relocation interval t3-t4, the $DR_{RI}$, 20%, is higher than the low drop ratio 10%. Thus in the next relocation interval t4-t5, 2 users are selected and requested to perform the CSN mobility management procedures. In relocation interval t5-t6, the $DR_{RI}$, is 8%, less than the low drop ratio. Hence after t6, the detection interval is set as the long detection interval.

Figure 6:
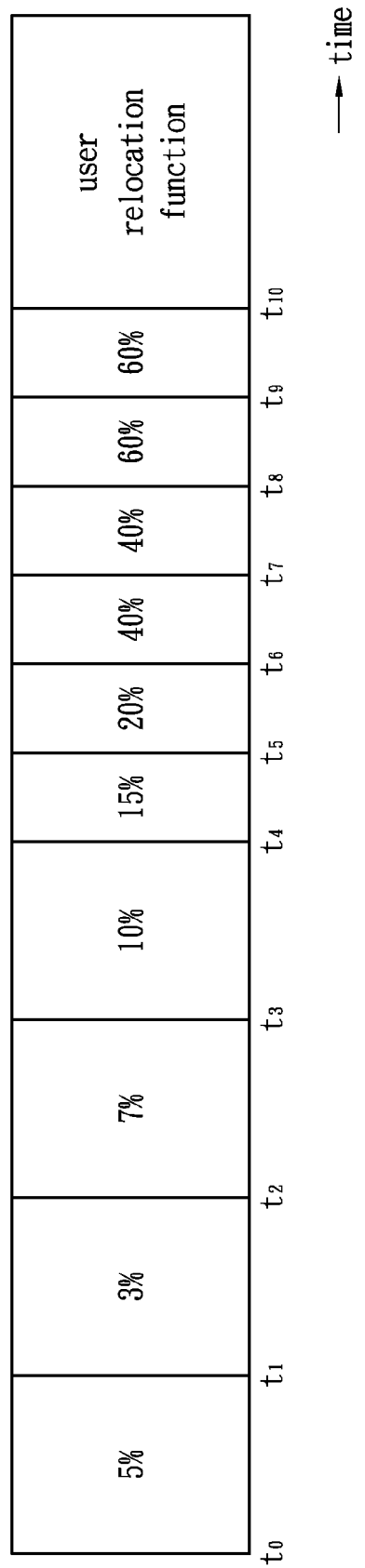

FIG. 6 shows an example of the determination of weighted moving average $WMA_{DR}(x)$. In this example, the low drop ratio is set at 10%, high drop ratio is set at 30%, long detection interval is set at 20 seconds, short detection interval is set at 10 seconds, n is 10, and $W_i$ is i times 0.1. In interval t9-t10, $WMA_{DR}(t10)$ is calculated as equation (2):

$$WMA_{DR} = \frac{10 \times 1.0 \times 60\% + 10 \times 0.9 \times 60\% + \ldots +}{10 \times 1.0 + 10 \times 0.9 + \ldots + 20 \times 0.4 + \ldots} \cong 30\% \qquad (2)$$

Since $WMA_{DR}(t10)$ exceeds H_DR, after t10 the user relocation function is performed.

Figure 7:
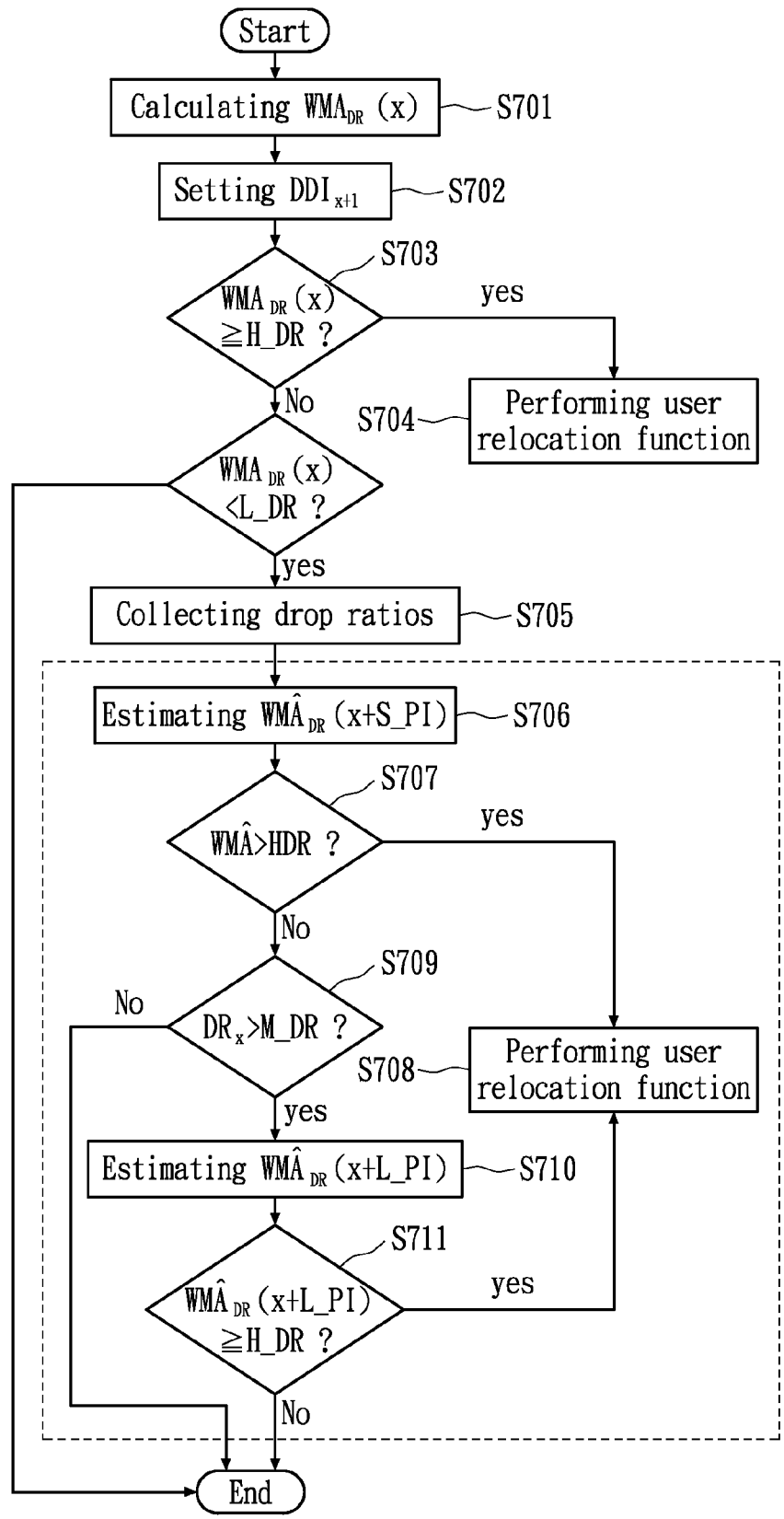
FIG. 7 shows another method for relocating network gateways according to one embodiment of the invention.

FIG. 7 shows another gateway relocation method 700. By predicting the traffic of ASN GW in advance, the user relocation function can be performed before ASN GW overloads. In step S701, the weighted moving average $WMA_{DR}(x)$ of the drop ratio during the $x^{th}$ detection interval $DDI_x$ is calculated. In some embodiments, drop ratios can be obtained by method 200, and a weighted moving average $WMA_{DR}(x)$ can be obtained by applying equation (1). In step S702, the $(x+1)^{th}$ detection interval $DDI_{x+1}$ is set. If $WMA_{DR}(X)$ is less than a low drop ratio, and the drop ratio of the $x^{th}$ detection interval is less than the low drop ratio, the $DDI_{x+1}$ is set as a long detection interval; otherwise, the $DDI_{x+1}$ is set as a short detection interval. In step S703 and S704, when the weighted moving average $WMA_{DR}(x)$ is equal to or exceeds a high drop ratio, a user relocation function is performed. Drop ratios are collected in step S705 to ensure that the moving average is based on sufficient information. Steps S706-S711 are related to ASN GW traffic prediction. In step S706, a predicted moving average $W\hat{M}A_{DR}(x+S\_PI)$ is estimated. If the predicted moving average $W\hat{M}A_{DR}(x+S\_PI)$ exceeds the high drop ratio, the user relocation function is performed, as shown in step S707-S708. If the $W\hat{M}A_{DR}(x+S\_PI)$ is less than the high drop ratio but exceeds a medium drop ratio (M_DR), a second predicted moving average $W\hat{M}A_{DR}(x+L\_PI)$ is estimated in step S710. If the second predicted moving average $W\hat{M}A_{DR}(x+L\_PI)$ exceeds the high drop ratio, the user relocation function is performed. In some preferred embodiments, the predicted moving average $W\hat{M}A_{DR}(x+S\_PI)$ is estimated by equation (3):

$$W\hat{M}A_{DR}(x+S\_PI) = \frac{\sum_{i=x+S\_PI-n}^{x+S\_PI}(DDI_i \times W_i \times DR_i)}{\sum_{i=x+S\_PI-n}^{x+S\_PI}(DDI_i \times W_i)}. \qquad (3)$$

The estimation of the second predicted moving average of future $W\hat{M}A_{DR}(x+L\_PI)$ is similar with the predicted moving average $W\hat{M}A_{DR}(x+S\_PI)$; thus the description is skipped herein.

Figure 8:
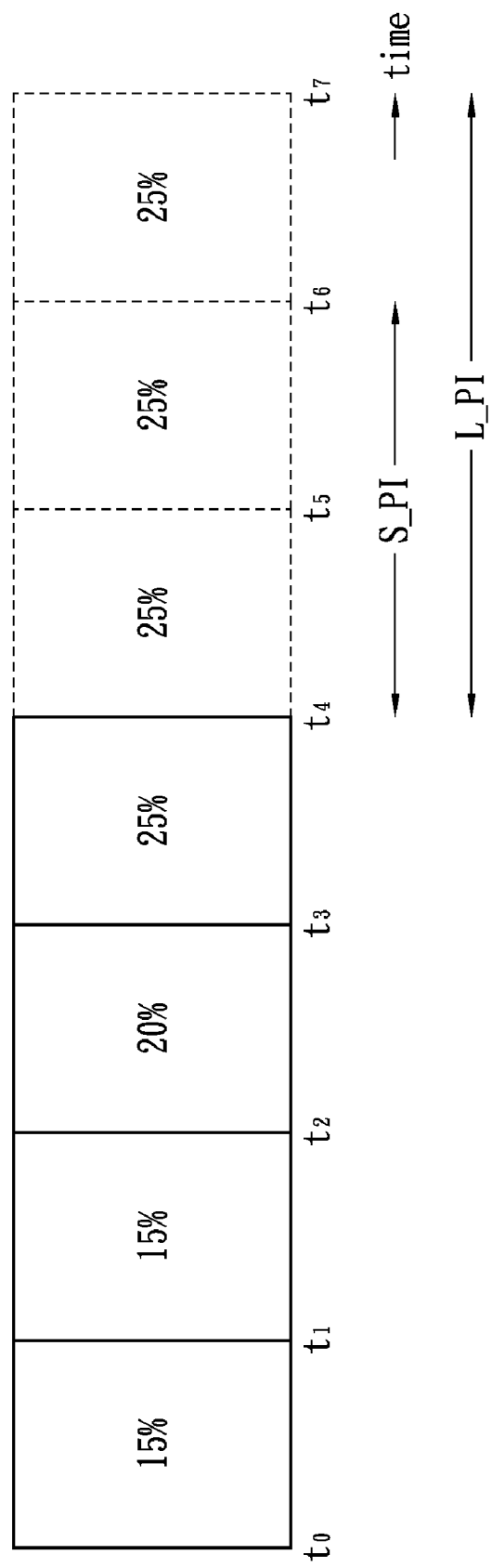
FIG. 8 shows an example of drop ratios under different detection intervals.

For further comprehension, an example of method 700 is described. In the example, the low drop ratio is set at 10%, the medium drop ratio is set at 25%, the high drop ratio is set at 30%, the long detection interval L_DI is set at 20 seconds, the short detection interval S_DI is set at 10 seconds, MAX-DRs is set at 10, and relocation interval is set at 5 seconds. FIG. 8 shows drop ratios under different detection intervals. After t5, the weighted moving average $WMA_{DR}(x)$ exceeds the low drop ratio, hence the moving average of future $W\hat{M}A_{DR}(x+S\_PI)$ is estimated.

Figure 9:
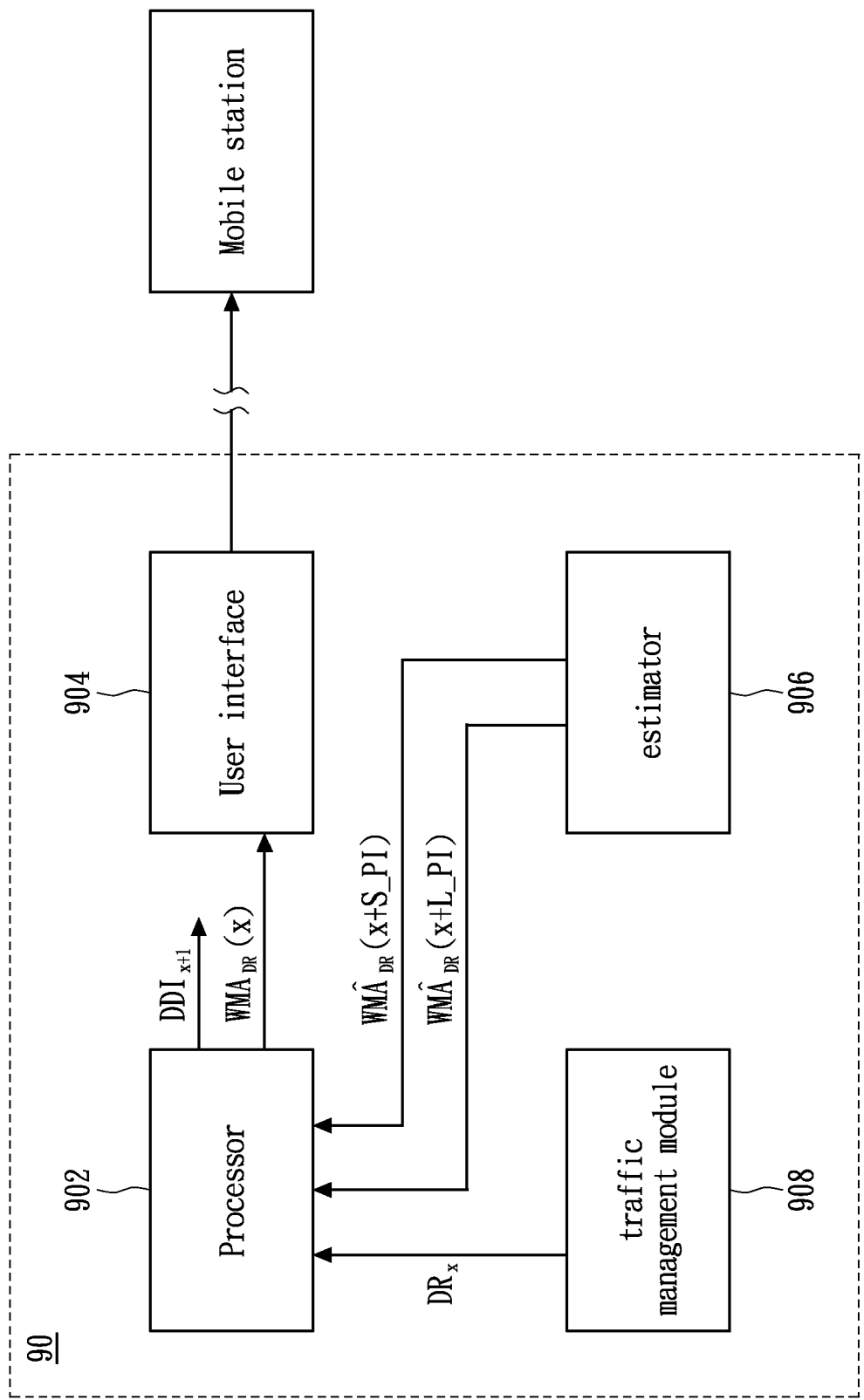
FIG. 9 shows a network gateway block diagram according to one embodiment of the invention.

FIG. 9 shows a network gateway diagram according to one embodiment of the invention. The network gateway 90 comprises a processor 902 and a user interface 904. The processor 902 calculates weighted moving average $WMA_{DR}(x)$, and updates the $(x+1)^{th}$ detection interval $DDI_{x+1}$. User interface 904 requests at least one user device to perform the user relocation function when the weighted moving average $WMA_{DR}(x)$ exceeds the high drop ratio. In some embodiments of the invention, the network gateway 90 further comprises a traffic management module 908. When the packets stored in the ASN GW queue exceed a threshold value, the traffic management module 908 marks arrived packets according to an RED algorithm. When the ASN GW queue is full, the drop ratio of packets is also recorded. In other embodiments of the invention, the network gateway 90 further comprises an estimator 906 for estimating predicted moving average $WMA_{DR}(x+S\_PI)$ and the second predicted moving average $W\hat{M}A_{DR}(x+L\_PI)$.

According to some embodiments of the invention, the traffic of anchored ASN GW is analyzed. If the loading of an anchored ASN GW is heavy, relocations are performed. In other embodiments, the future traffic of anchored ASN GW is predicted. The anchored ASN GW can perform mobility management before its loading is too heavy. Under these circumstances, the connection quality is not delayed due to ASN GW overloading.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for relocating network gateways comprising the steps of:
    calculating a moving average of drop ratios for an $x^{th}$ detection interval, wherein x is an integer;
    setting an $(x+1)^{th}$ detection interval as a long detection interval when the moving average of drop ratios is less than a low drop ratio;
    setting the $(x+1)^{th}$ detection interval as a short detection interval when the moving average of drop ratios is equal to or exceeds the low drop ratio; and
    performing a user relocation function when the moving average of drop ratios for the $x^{th}$ detection interval is equal to or exceeds a high drop ratio, wherein the user relocating function comprises requesting at least one user device to activate a connectivity service network (CSN) mobility management procedure.

2. The method as claimed in claim 1, further comprising a step of generating each drop ratio by a packet traffic arrangement, the generating step comprising:
    marking a plurality of packets according to a random early detection algorithm when the number of packets in a queue exceeds a threshold value, wherein targets of the marked packets are other network gateways; and
    dropping every newly arrived packet, recording a drop rate, and calculating a drop ratio according to the drop rate when the queue is full.

3. The method as claimed in claim 1, wherein the moving average of drop ratios is determined by the following equation:

$$WMA_{DR}(x) = \frac{\sum_{i=x-n}^{x}(DDI_i \times W_i \times DR_i)}{\sum_{i=x-n}^{x}(DDI_i \times W_i)},$$

wherein $WMA_{DR}(x)$ is the moving average of drop ratios for the $x^{th}$ detection interval, $DDI_i$ is the $i^{th}$ detection interval, $DR_i$ is the $i^{th}$ drop ratio, $W_i$ is the $i^{th}$ weight, and n is an integer.

4. The method as claimed in claim 3, wherein n is an integer less than a maximum average width and greater than a minimum average width.

5. The method as claimed in claim 1, wherein the user relocation function further comprises:
    selecting $N_i$ users and requesting the $N_i$ users to activate the CSN mobility management procedures;
    calculating a drop ratio in a relocation interval; and
    selecting $N_{i+1}$ users and requesting the $N_{i+1}$ users to activate the CSN mobility management procedures when the drop ratio in the relocation interval exceeds the low drop ratio, wherein $N_{i+1}$ is an integer larger than $N_i$.

6. The method as claimed in claim 5, wherein $N_1$ is 1, and $N_{i+1}$ equals $N_i$ times two.

7. The method as claimed in claim 1, wherein the CSN mobility management procedure is a mobility management procedure compatible with IEEE 802.16 standard.

8. A method of relocating network gateways comprising the steps of:
    calculating a moving average of drop ratios for an $x^{th}$ detection interval, wherein x is an integer;
    setting the $(x+1)^{th}$ detection interval according to a low drop ratio and the moving average of drop ratios;
    performing a user relocation function when the moving average of drop ratios is equal to or exceeds a high drop ratio, wherein the user relocation function comprises requesting at least one user device to activate a connectivity service network (CSN) mobility management procedure;
    estimating a predicted moving average when the moving average of drop ratio is less than the high drop ratio and is equal to or exceeds the low drop ratio; and
    performing the user relocation function when the predicted moving average is equal to or exceeds the high drop ratio.

9. The method as claimed in claim 8, wherein the step of estimating the predicted moving average further comprises the steps of:
    estimating a second predicted moving average when the predicted moving average is less than a high drop ratio and a concurrent drop ratio is equal to or exceeds a medium drop ratio; and
    performing the user relocation function when the second predicted moving average is equal to or exceeds the high drop ratio.

10. The method as claimed in claim 9, wherein the predicted moving average is determined by the following equation:

$$W M \hat{A}_{DR}(x+\text{S\_PI}) = \frac{\sum_{i=x+\text{S\_PI}-n}^{x+\text{S\_PI}} (DDI_i \times W_i \times DR_i)}{\sum_{i=x+\text{S\_PI}-n}^{x+\text{S\_PI}} (DDI_i \times W_i)},$$

wherein $W M \hat{A}_{DR}(x+\text{S\_PI})$ is the predicted moving average, S_PI is a first prediction width, $DDI_i$ is the $i^{th}$ interval, $DR_i$ is the $i^{th}$ drop ratio, $W_i$ is the $i^{th}$ weight, and n is an integer.

11. The method as claimed in claim 9, wherein the second predicted moving average is determined by the following equation:

$$W M \hat{A}_{DR}(x+\text{L\_PI}) = \frac{\sum_{i=x+\text{L\_PI}-n}^{x+\text{L\_PI}} (DDI_i \times W_i \times DR_i)}{\sum_{i=x+\text{L\_PI}-n}^{x+\text{L\_PI}} (DDI_i \times W_i)},$$

wherein $W M \hat{A}_{DR}(x+\text{L\_PI})$ is the second predicted moving average, L_PI is a second prediction width, $DDI_i$ is the $i^{th}$ interval, $DR_i$ is the $i^{th}$ drop ratio, $W_i$ is the $i^{th}$ weight, and n is an integer.

12. The method as claimed in claim 8, further comprising a step of generating each drop ratio by a packet traffic arrangement, the generating step comprising:

marking a plurality of packets when the number of packets stored in a queue exceeds a threshold value according to a random early detection algorithm, wherein the target of the marked packets stored in the queue are other network gateways; and dropping every newly arrived packet, recording a drop rate, and calculating the drop ratio according to the drop rate when the queue is full.

13. The method as claimed in claim 8, wherein the moving average of drop ratios is determined by the following equation:

$$WMA_{DR}(x) = \frac{\sum_{i=x-n}^{x} (DDI_i \times W_i \times DR_i)}{\sum_{i=x-n}^{x} (DDI_i \times W_i)},$$

wherein $WMA_{DR}(x)$ is the moving average of drop ratio for the $x^{th}$ detection interval, $DDI_i$ is the $i^{th}$ interval, $DR_i$ is the $i^{th}$ drop ratio, $W_i$ is the $i^{th}$ weight, and n is an integer.

14. The method as claimed in claim 8, wherein the user relocation function further comprises the steps of:

selecting $N_i$ users and requesting the $N_i$ users to activate the CSN mobility management procedure, wherein both i and $N_i$ are integers;

calculating a drop ratio in a relocation interval; and selecting $N_{i+1}$ users and requesting the $N_{i+1}$ users to activate the CSN mobility management procedures when the drop ratio in the relocation interval exceeds the low drop ratio, wherein $N_{i+1}$ is an integer larger than $N_i$.

15. The method as claimed in claim 14, wherein $N_1$ is 1, and $N_{i+1}$ equals Ni times two.

16. The method as claimed in claim 8, wherein the CSN mobility management procedure is a mobility management procedure compatible with IEEE 802.16 standard.

* * * * *